United States Patent
Kang et al.

(10) Patent No.: US 7,835,137 B2
(45) Date of Patent: Nov. 16, 2010

(54) SUPERCAPACITOR AND ELECTROCHEMICAL APPARATUS FOR WATER PURIFICATION

(75) Inventors: Hyo-rang Kang, Yongin-si (KR); Ho-jung Yang, Yongin-si (KR)

(73) Assignee: Samsung Electronics Co., Ltd. (KR)

(*) Notice: Subject to any disclaimer, the term of this patent is extended or adjusted under 35 U.S.C. 154(b) by 351 days.

(21) Appl. No.: 12/040,217

(22) Filed: Feb. 29, 2008

(65) Prior Publication Data

US 2009/0086409 A1 Apr. 2, 2009

(30) Foreign Application Priority Data

Jun. 5, 2007 (KR) .............. 10-2007-0055249

(51) Int. Cl.
*H01G 9/00* (2006.01)

(52) U.S. Cl. .............. 361/502; 361/503; 361/504; 361/509; 361/512; 361/516

(58) Field of Classification Search .............. 361/502, 361/503–504, 508–512, 523–528, 516–519, 361/303–305
See application file for complete search history.

(56) References Cited

U.S. PATENT DOCUMENTS

| 6,195,252 | B1 |  | 2/2001 | Belyakov et al. |
| 6,459,565 | B1 | * | 10/2002 | Lessner et al. .............. 361/508 |
| 6,885,545 | B2 | * | 4/2005 | Michel et al. .............. 361/502 |
| 7,088,572 | B2 | * | 8/2006 | Yoshida et al. .............. 361/504 |
| 7,099,143 | B1 | * | 8/2006 | Fife et al. .................... 361/516 |
| 2002/0163770 | A1 | * | 11/2002 | Shiue et al. .................. 361/502 |
| 2003/0035982 | A1 |  | 2/2003 | Ryu et al. |

FOREIGN PATENT DOCUMENTS

EP 0864166 9/1998

* cited by examiner

*Primary Examiner*—Nguyen T Ha
(74) *Attorney, Agent, or Firm*—Cantor Colburn LLP

(57) ABSTRACT

A supercapacitor which includes a cathode, an anode, a separator interposed between the cathode and the anode, and an electrolyte interposed between the cathode and the anode to allow current to flow. The cathode includes a catalyst having characteristics of a pseudo capacitor and a binder, and an electrochemical apparatus for water purification including the same.

17 Claims, 5 Drawing Sheets

WITH NO POTENTIAL DIFFERENCE APPLIED

WITH POTENTIAL DIFFERENCE APPLIED

SUPERCAPACITOR AND ELECTROCHEMICAL APPARATUS FOR WATER PURIFICATION

This application claims the benefit of Korean Patent Application No. 10-2007-0055249, filed on Jun. 5, 2007, all of the benefits under 35 U.S.C §119, the contents of which in its entirety are herein incorporated by reference.

BACKGROUND OF THE INVENTION

1. Field of the Invention

The present invention relates to a supercapacitor and an electrochemical apparatus for water purification using the same, and more particularly, to a supercapacitor having high power output and energy density and an electrochemical apparatus that can be efficiently used for water purification using the same.

2. Description of the Related Art

Today, personal information as well as commercial information has been highly valued. Accordingly, there is a need for highly reliable information communication systems. Also, stable electrical energy sources are necessary. Further, as markets for compact or portable electronic devices, such as notebook computers, and cellular phones have rapidly grown, conditions of the batteries for these electronic devices such as high-energy density, a long life, ultra slimness, lightweight, stability and ecological affinity have been strongly required. In order to meet these requirements, energy storage type capacitors, which are an energy source system ensuring stable electrical energy supply, have recently been focused on.

Energy storage type capacitors include a mechanism capable of functioning as a conventional capacitor for storing energy and are energy storing devices capable of crosslinking batteries and capacitors. The energy storage type capacitors which have intermediate characteristics of both condensers and secondary batteries with regard to energy density and power density are capacitors having shorter charge time, longer lifetime, and higher power output compared to secondary batteries, and have an energy density at least 100 times that of conventional condensers.

That is, the energy storage type capacitors have advantages of power characteristics of condensers and high energy storage characteristics of secondary batteries.

In addition, positive and negative charges are distributed at very short intervals in an interface between a porous activated nano-carbon solid electrode and an electrolyte solution.

When the porous activated nano-carbon solid electrode is positively charged, negative ions of the electrolyte solution are distributed to compensate for the positive charge. On the other hand, when the porous activated nano-carbon solid electrode is negatively charged, positive ions of the electrolyte solution are distributed to compensate for the negative charge. The arrangement of charges results in an electrical double layer, which is formed by a non-faradic reaction without electron transfer between the porous activated nano-carbon electrode and electrolyte ions.

The energy storage type capacitor is an energy storage device that converts chemical reaction into electrical energy using electrostatic orientation (electrochemical double layer) of ions in the interface between the electrode and the electrolyte and stores the electrical energy. Thus, capacitance (C) of conventional capacitors is proportional to a contact area, and is inversely proportional to a distance between positive charges and negative charges, i.e., the thickness of a dielectric layer. Since the energy storage type capacitor uses nano-scale porous carbon as an electrode material on the surface thereof, the surface area of the energy storage type capacitor dramatically increases. Further, while the thickness of the dielectric layer of conventional capacitors is measured in micrometers, the thickness of the dielectric layer of the energy storage type capacitor is only around 10 Å of ionic layer, and thus capacitance (C) is of a ultra high capacity. Such an energy storage type capacitor is also referred to as a "supercapacitor".

The energy storage type capacitor is classified into two types according to its operating principle, an electrochemical double-layer capacitor ("EDLC") which stores charges in an electrical double layer of an interface between an electrode and an electrolyte, and a pseudo capacitor which stores charges or electrons with changes in oxidation number of transition metal ions on the surface of a transition metal oxide. However, although the energy storage type capacitor requires a wide specific surface area because of using activated carbon in the electrode, the available specific surface area for calculation of the actual capacitance (C) is only approximately 20 to 30% of the total specific surface area. This is related to ion size of the electrolyte to be adhered to the activated carbon and adsorption degree.

That is, porous activated carbon is classified into three types, microporous activated carbon, mesoporous activated carbon and macroporous activated carbon according to pore size. The pore size of the macroporous activated carbon is too large for ions in the electrolyte to enter the pores. Thus, the large number of macropores decreases the specific surface area which is an advantage of using activated carbon. Thus, power density of the energy storage type capacitor can be improved only by maintaining a mesopores structure which is suitable for the ion size of the electrolyte.

In conventional EDLCs, both of the cathode and anode use activated carbon, and the cathode adsorbs anions and the anode adsorbs cations. In ELDC, two capacitors are connected in series, and thus only approximately half of the capacities of the cathode and the anode can be used. To overcome those problems, a hybrid power system having maximized capacitor capacity has been developed and disclosed in EP 0864166, US 20030035982, and U.S. Pat. No. 6,195,252.

Conventional hybrid systems have serious corrosion problems since a KOH solution or an organic solvent is used as the electrolyte solution, and cannot be used to soften tap water, and thus characteristics thereof need to be improved.

BRIEF SUMMARY OF THE INVENTION

The present invention has made an effort to solve the above-stated problems and aspects of the present invention provides a supercapacitor having high power output and energy density, and an electrochemical apparatus for water purification using the same.

In an exemplary embodiment, the present invention provides a supercapacitor including a cathode, an anode, a separator interposed between the cathode and the anode, and an electrolyte interposed between the cathode and the anode to allow current to flow.

The cathode includes a catalyst having characteristics of a pseudo capacitor and a binder.

According to an exemplary embodiment, the catalyst is a material capable of reversibly oxidizing and reducing at least one of a hydroxyl group and oxygen in the electrolyte. Further, according to an exemplary embodiment, the catalyst is at least one of a nano metal and a metal oxide, or a supported catalyst in which a nano metal or a metal oxide is loaded on a conductive support.

According to an exemplary embodiment, the conductive support is carbon black, titanium carbide (TiC), or a conductive powder having a specific surface area of at least $10\ m^2/g$.

Further, the nano metal is at least one selected from the group consisting of platinum (Pt), Rhodium (Rh), gold (Au), silver (Ag), Iridium (ir), palladium (Pd), cobalt (Co), vanadium (V), and iron (Fe) having a mean particle diameter in the range of approximately 2 to 20 nm.

The anode includes a carbonaceous material and a binder, and the carbonaceous material is selected from the group which includes activated carbon, carbon nanotubes ("CNT"), and mesoporous carbon.

In another exemplary embodiment, the present invention provides an electrochemical apparatus for Water purification including the supercapacitor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
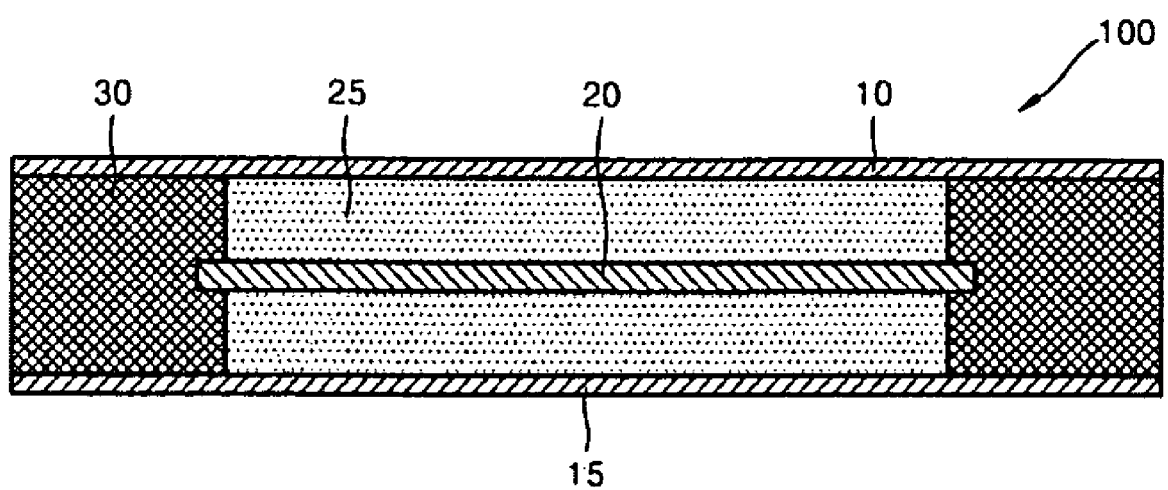
FIG. 1A illustrates an exemplary embodiment of a supercapacitor according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried; region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detailed with reference to the accompanying drawings.

The term "supercapacitor" used herein is a capacitor having ultra high capacity.

According to an exemplary embodiment of the present invention, a supercapacitor includes a cathode, an anode, a separator interposed between the cathode and the anode, and an electrolyte interposed between the cathode and the anode to allow current to flow, the cathode includes a catalyst having characteristics of a pseudo capacitor and a binder. Since a very fast catalytic reaction of the cathode is employed, a reaction capacity of the cathode is far greater than that of the anode, and thus the capacity of the entire cell system is increased.

According to an exemplary embodiment, the characteristics of the pseudo capacitor indicates characteristics of catalytic reaction in which reactants such as a hydroxyl group or oxygen in the electrolyte are reversibly oxidized and reduced.

The catalyst is a material that can reversibly oxidize and reduce at least one of a hydroxyl group and oxygen in the electrolyte. According to an exemplary embodiment, the catalyst is at least one of a nano metal and a metal oxide, or a supported catalyst in which a nano metal is loaded on a conductive support.

According to an exemplary embodiment, the nano metal is at least one of Pt, Rh, Au, Ag, Ir, Pd, Co, V, and Fe. A mean particle diameter of the nano metal is in the range of approximately 2 to 20 nm. When the mean particle diameter of the nano metal is less than 2 nm, the catalyst cannot easily be prepared. On the other hand, when the mean particle diameter of the nano metal is greater than 20 nm, effective specific surface area of the catalyst may decrease, and the amount of catalyst used may increase.

The metal oxide that is a material having characteristics of a pseudo capacitor is at least one of $CaTiO_3$, $NaWO_3$, $MnO_2$, $PbO_2$, $RuO_2$, and $TiO_2$.

A conductive support made of a conductive composite is one of carbon black, TiC, or conductive powder, the conductive support has a specific surface area of at least 10 $m^2/g$, and in the range of approximately 50 to 2000 $m^2/g$.

According to an exemplary embodiment, a supported catalyst which is used as the catalyst is Pt/C, Pt—Co/C, or the like.

In the supported catalyst, the amount of at least one of the nano metal and nano metal oxide is in the range of approximately 2 to 70 parts by weight based on 100 parts by weight of the total weight of the nano metal and the conductive support.

According to an exemplary embodiment, the anode in the supercapacitor includes a carbonaceous material and a binder. The carbonaceous material is at least one of activated carbon, carbon nanotube (CNT), and mesoporous carbon.

Any material that provides binding strength for binding cathode and anode components to a current collector can be used as the binder included in the cathode and the anode. According to an exemplary embodiment, the binder includes fluorinated ethylene propylene ("FEP"), styrene butadiene rubber ("SBR"), and carboxymethylcellulose ("CMC"), but are not limited thereto.

The electrolyte is an aqueous solution in which a salt is dissolved. The electrolyte is 0.5 to 6 M of one of sodium chloride solution, magnesium sulfate solution, and calcium sulfate solution, or a high concentration (5 to 100 wt %) of sulfuric acid or phosphoric acid.

According to an exemplary embodiment, the electrolyte is tap water.

FIG. 1A illustrates an exemplary embodiment of a supercapacitor according to the present invention.

In FIG. 1, the supercapacitor 100 includes a cathode 10 having a positive electrode, an anode 15 having a negative electrode which is formed to be symmetrical to the cathode 10 at a predetermined interval, a separator 20 formed between the cathode 10 and the anode 15 to prevent the two electrodes from being adhered to each other, an electrolyte 25 formed between the cathode 10 and the anode 15 to allow current to flow, and a gasket 30 preventing the electrolyte 25 from flowing out.

According to an exemplary embodiment, the cathode 10 includes a current collector 35 (see FIG. 2A, for example) formed of a wide flat plate having conductivity, and a cathode electrode unit formed on the current collector 35 in which a catalyst and a binder are coated on the cathode electrode unit.

According to an exemplary embodiment, the anode 15 includes a current collector 40 formed of a wide flat plate having conductivity, and an anode electrode unit formed on the current collector 40 in which a carbonaceous material and a binder are coated on the anode electrode unit.

According to an exemplary embodiment, the current collector 35 and 40 included in the cathode 10 and the anode 15 includes a shape of carbon plate, carbon paper, metal plate, metal mesh, or metal foam, and is formed of aluminum, nickel, copper, titanium, stainless still, iron, or the like. The current collector 35 and 40 according to the present invention is carbon paper.

Hereinafter, a method of preparing a supercapacitor 100 according to an embodiment of the present invention will be described.

First, the cathode 10 is prepared according to the following processes.

A catalyst having characteristics of a pseudo capacitor as an active material forming a cathode electrode unit, a binder and a solvent are mixed to prepare a composition to form a cathode electrode unit.

According to an exemplary embodiment, the solvent is water, alcohol, or the like. The alcohol includes isopropyl alcohol, ethanol, butanol, pentanol, heptanol, propanol, or hexanol. The amount of the solvent is in the range of approximately 2 to 70 parts by weight based on 100 parts by weight of the catalyst.

Then, the composition is coated on a current collector 35 and 40, dried, and heat-treated to prepare a cathode 10. As described above, the cathode 10 includes the current collector 35 and the cathode electrode unit formed thereon.

The coated composition is dried at a temperature in the range of approximately 20 to 120° C. and at room temperature (20 to 25° C.). The heat-treatment is performed at a temperature in the range of approximately 80 to 250° C. When the drying and heat-treatment is not performed within the temperature range above, discharge characteristics of the cathode may decrease.

Separately, an anode 15 is prepared in the same manner as in preparation of the cathode 10 except that a carbonaceous material is used instead of the catalyst. Here, the anode 15 includes a current collector 40 and an anode electrode unit like the cathode.

A separator 20 is interposed between the prepared cathode 10 and anode 15, and an electrolyte 25 is interposed between the cathode 10 and the anode 15 to allow current to flow, and as such a supercapacitor 100 is completed.

According to an exemplary embodiment, the separator 20 is a cellulose-based film, Teflon-based film, polypropylene (PP)-based film, polyethylene (PE)-based film, or the like.

According to an exemplary embodiment, the electrolyte 25 is an aqueous solution in which a salt is dissolved as described above, and an example of the electrolyte is sodium chloride solution.

Figure 1B:
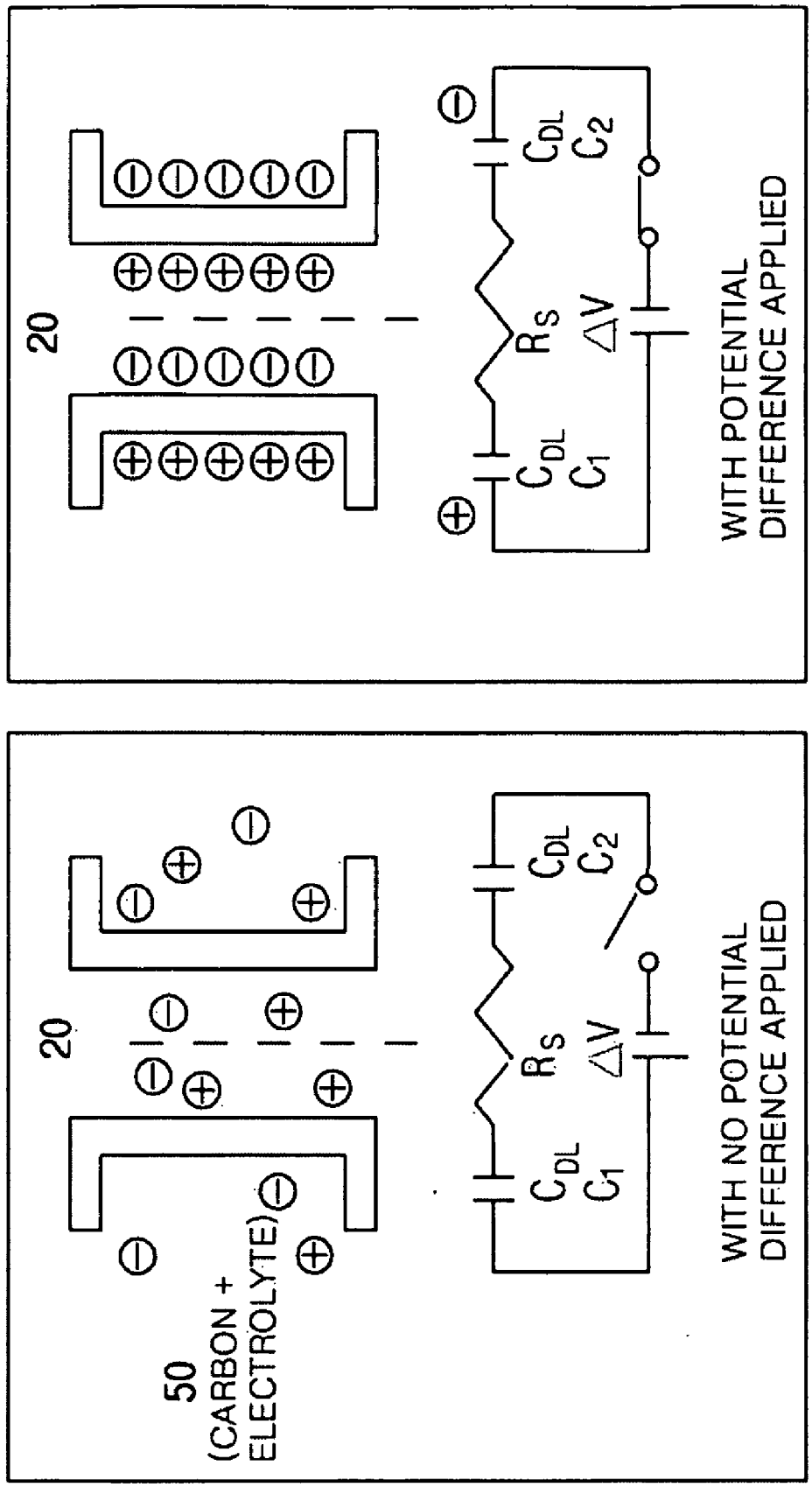
FIG. 1B illustrates an exemplary embodiment of supercapacitors according to the present invention, before and after potential is applied thereto.

FIG. 1B illustrates an exemplary embodiment of supercapacitors according to the present invention before and after electric potentials are applied thereto. The total capacity of the capacitor shown in FIG. 1B was calculated and the results are shown in Table 1. $C_{DL}$ in FIG. 1B represents double layer capacitance, and Rs indicates a solution resistance. C1 in Table 1 indicates cathode capacitor, and C2 indicates anode capacitor. Carbon in FIG. 1B is activated carbon.

TABLE 1

| C1 capacity | C2 capacity | Ct capacity (F/g) |
|---|---|---|
| 1 | 1 | 0.50 |
| 2 | 1 | 0.67 |
| 4 | 1 | 0.80 |
| 5 | 1 | 0.83 |
| 10 | 1 | 0.91 |
| 20 | 1 | 0.95 |
| 50 | 1 | 0.98 |
| 100 | 1 | 0.99 |

The total capacity $C_T$ described in Table 1 is calculated using Equation 1 below.

$$C_T = \frac{C_1 \times C_2}{C_1 + C_2} \quad \text{Equation 1}$$

The supercapacitor 100 according to the present invention includes one capacitor between the cathode 10 and the electrolyte 25 and one capacitor between the anode 15 and the electrolyte 25, and thus includes two capacitors in total. The supercapacitor 100 has a structure in which the two capacitors are connected in series. Thus, the capacity of the cathode 10 needs to be larger than that of the anode 15 to increase the entire capacity of the capacitor as shown in Table 1. Accordingly, an activated carbon electrode is used as the anode and a catalyst having a capacity at least 100 times larger than that of the anode is used as the cathode to largely increase the entire capacity of the supercapacitor.

When a supported catalyst, in which a catalyst metal is loaded on a conductive support having a large specific surface area, is used as the catalyst included in the cathode 10 of the supercapacitor 100 according to an exemplary embodiment of the present invention, electrode capacity can be increased by oxidizing and reducing the hydroxyl group or oxygen in the electrolyte 25 and energy storage capability can be improved by reducing internal resistance of the electrode 50. Accordingly, energy storage-capability can be improved by at least two times compared to conventional energy storage type capacitors, and costs for the current collector and separator can be reduced.

The supercapacitor 100 according to the present invention is effectively used in an electrochemical apparatus for water purification, but the application thereof is not limited thereto. Particularly, the electrochemical apparatus is suitable for water softening, wherein hard water is converted to soft water by removing cations in water.

Water softening which converts hard water to soft water is a system reducing the amount of cations in water, particularly bivalent cations such as $Ca^{2+}$ and $Mg^{2+}$, to less than 60 ppm.

The electrolyte 25 in the electrochemical apparatus according to the present invention used for water softening is an aqueous solution such as tap water.

Figure 2A:
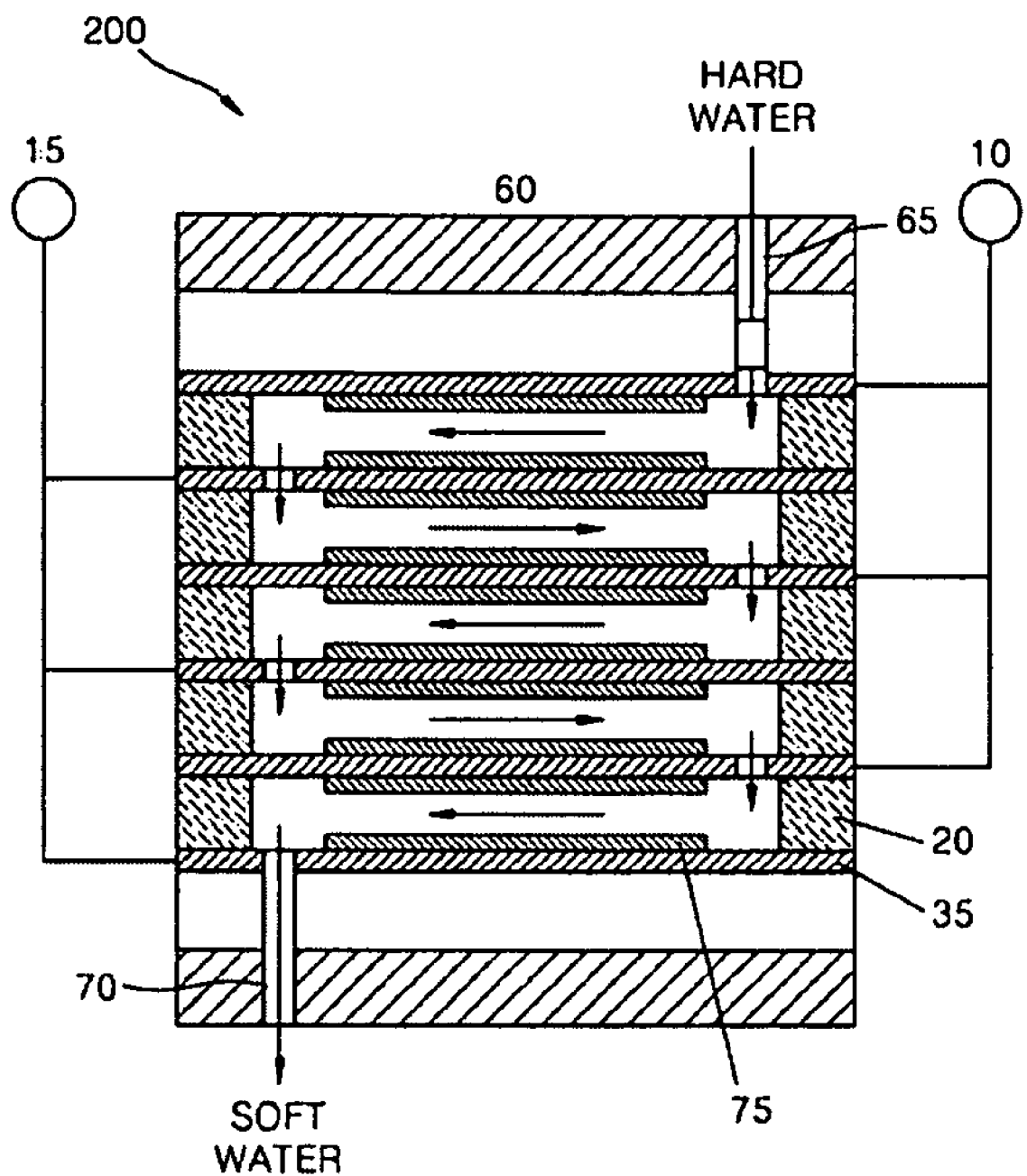
FIGS. 2A and 2B illustrates an exemplary embodiment of an electrochemical apparatus for softening water using a supercapacitor according to the present invention.
Figure 2B:
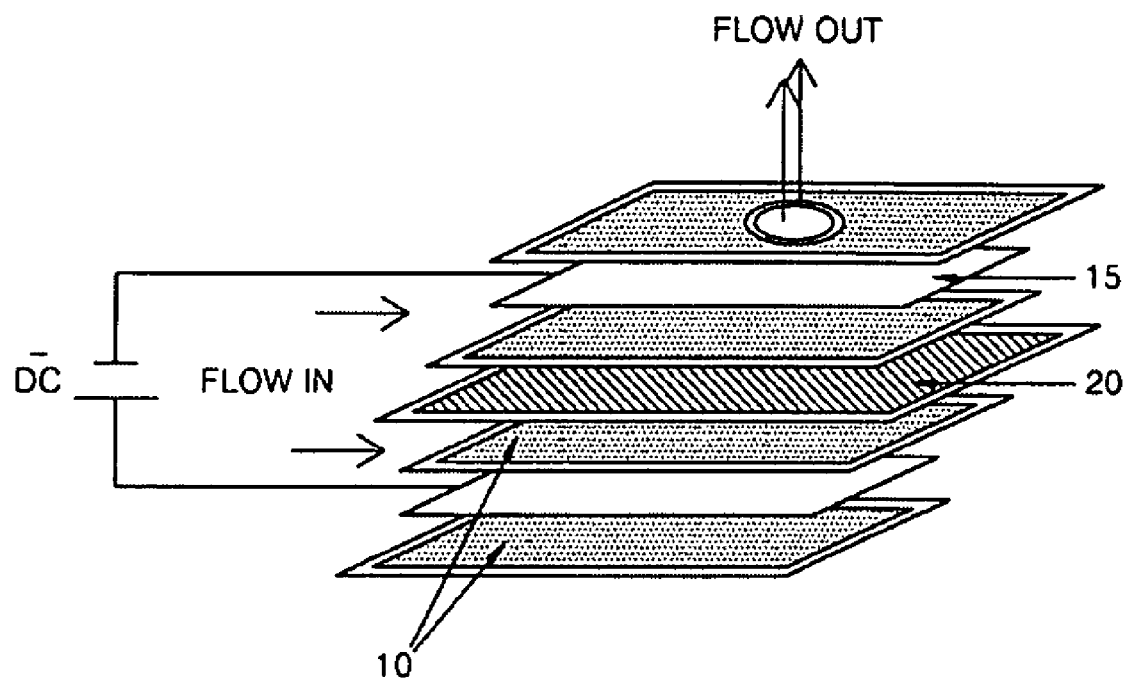

FIGS. 2A and 2B illustrates an exemplary embodiment of an electrochemical apparatus for water purification, particularly, an electrochemical apparatus for water softening using a supercapacitor according to the present invention.

FIG. 2A schematically illustrates an exemplary embodiment of a serpentine type electrochemical apparatus for softening water, and FIG. 2B schematically illustrates an exemplary embodiment of a planar type electrochemical apparatus for softening water.

Referring to FIGS. 2A and 2B, the electrochemical apparatus 200 for softening water includes a capacitive deionization (CDI) stack 60 having a supercapacitor according to the present invention, a power supply supplying power source thereto, a hard water inlet pipe 65 through which hard water flow in the CDI stack 60, and a soft water outlet pipe 70 through which soft water generated in the CDI stack 60 flows out. A separator 20 is interposed between the cathode 10 and the anode 15 to prevent the cathode 10 and the anode 15 from being adhered to each other. A porous material 75 in FIG. 2A is an electrode active material.

The electrochemical apparatus 200 for water softening illustrated in FIGS. 2A and 2B uses the CDI technology to soften hard water. Here, ionic materials are adsorbed on the surface of the electrode and removed by applying voltage to a nano porous carbon electrode to have polarity. Then, the adsorbed ionic materials are discharged with water by applying inverse voltage to the electrode during its regeneration (i.e., restoration). When this system is used, chemicals/exchange resin and expensive filter and membrane are not required for regeneration [restoration], elements of hard water and harmful ions are removed, and excellent insulation performance and high capacitance are obtained compared to conventional water softening devices.

Hereinafter, the present invention will be described in more detail with reference to the following examples. The following examples are for illustrative purposes and are not intended to limit the scope of the invention.

A cathode 10 and an anode 15 were respectively prepared according to the following processes.

First, 1 g of a supported catalyst including 45.8 wt % of Pt having a mean particle diameter of 3 to 5 nm and Vulcan XC-72 having a specific surface area of about 250 $m^2/g$ was mixed with 2 g of water, 0.2 g of isopropyl alcohol, and 0.2 g of fluorinated ethylene propylene (FEP) emulsion as a binder, and the mixture was mixed in a sonic bath for 2 hours to prepare a slurry for a cathode. The slurry was coated on carbon paper as a current collector, and dried at room temperature for 1 hour. Then, the resultant was heat-treated at 150° C. for 5 hours to prepare a cathode.

Separately, 1 g of activated carbon having a specific surface area of 1500 $m^2/g$ as an active material, 2.5 g of 2% carboxymethylcellulose (CMC) aqueous solution as a binder and thickener, 0.167 g of 30 wt % SBR waterborne solution, and 5 g of water were mixed to prepare a slurry for an anode 15. The slurry was coated on carbon paper as a current collector 35, and dried at room temperature for 1 hour. Then, the resultant heat-treated at 150° C. for 5 hours to prepare an anode 15.

The cathode 10 and anode 15 were cut into pieces of 3×3 cm, a cellulose film as a separator 20 was interposed between the cathode 10 and the anode 15, and 500 ppm of NaCl aqueous solution was used as an electrolyte 25 to prepare a cell.

Figure 3:
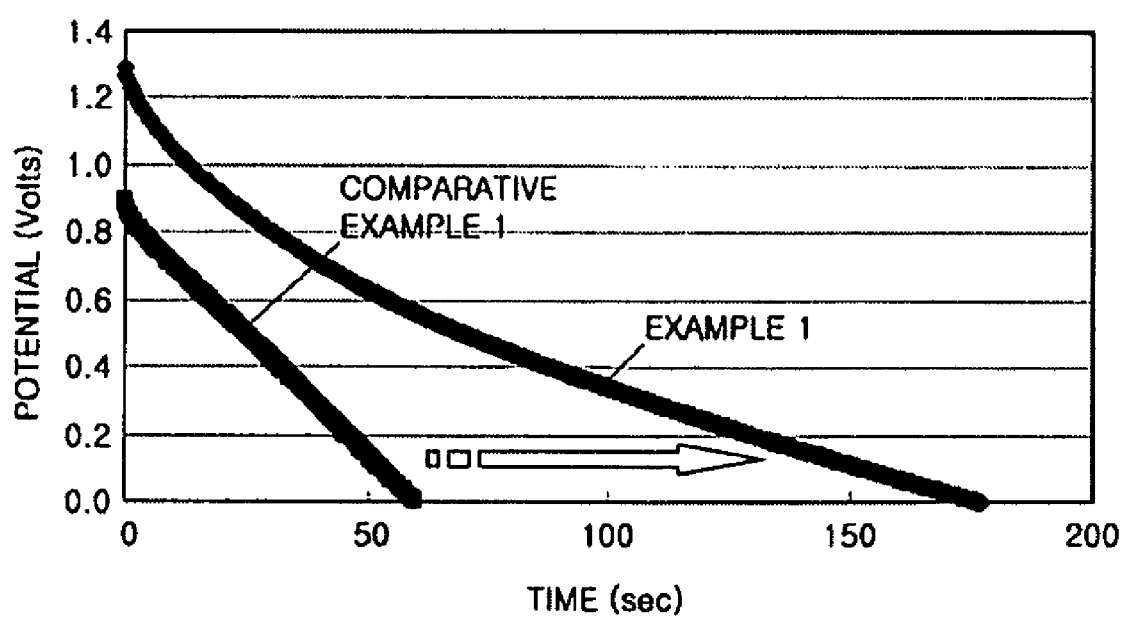
FIG. 3 illustrates a graph of discharge characteristics of cells according to Example 1 and Comparative Example 1.

Performance of the cell was evaluated, and the results are shown in FIG. 3. The cell was charged with a constant current of 20 mA until the cell reached 1.4 V, and then, the cell was charged with a constant voltage of 1.4 V to a cut-off current of 2 mA. The cell was discharged with a constant current of 20 mA to a cut-off voltage of 0 V.

As shown in FIG. 3, the cathode 10 using the catalyst electrode according to Example 1 had approximately 3 times improved capacity compared to the cathode 10 using a typical activated carbon electrode according to Comparative Example 1, and thus it was identified that capacity was improved in Example 1.

Figure 4:
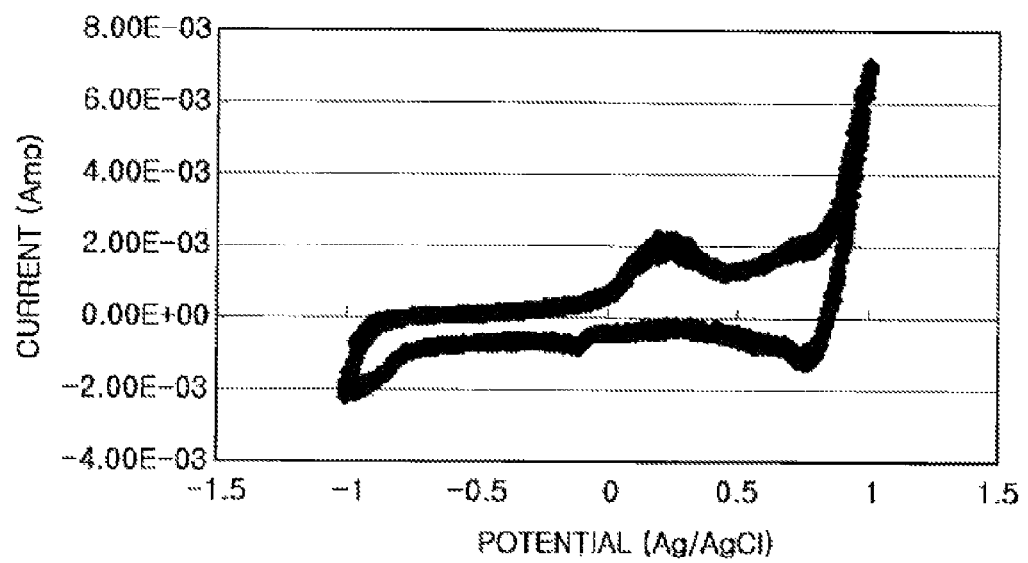
FIGS. 4 and 5 illustrates graphs of cyclovoltametry characteristics of cells according to Example 1.
Figure 5:
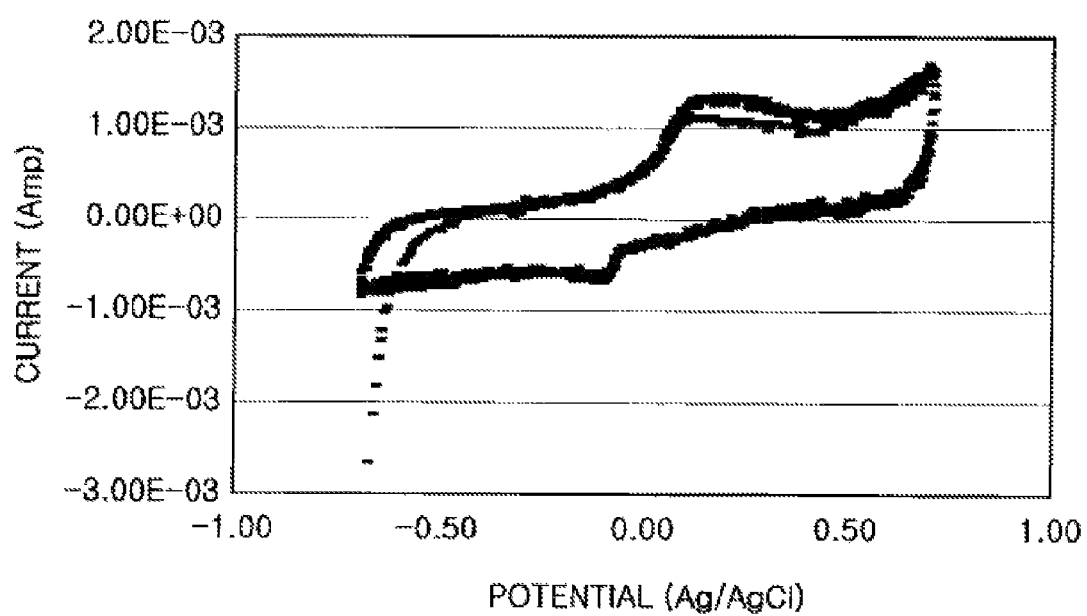

Cyclovoltametry characteristics of the cell according to Example 1 were measured, and the results are shown in FIGS. 4 and 5.

Referring to FIGS. 4 and 5, when the cathode 10 including Pt as a catalyst is used, oxidization is performed on the Pt catalyst and then corresponding reduction is performed, and thus it was identified that reversible reactions occur. The top graph of the FIGS. 4 and 5 are obtained at a voltage in the range of −1 to 1 Volt (Ag/AgCl reference electrode), and the bottom graph is obtained at a voltage in the range of −0.7 to 0.7 Volt. This test is an experiment to figure out a stable voltage range. The system is stable in the voltage range of −0.7 to 0.7 V.

COMPARATIVE EXAMPLE 1

1 g of activated carbon having a specific surface area of 1500 $m^2$/g, 2.5 g of 2 wt % CMC, 0.167 g of 30 wt % SBR, and 5 g of water were mixed to prepare a cathode slurry and an anode slurry. The cathode and anode slurries were respectively coated on carbon paper, and dried at room temperature for 1 hour. Then, the resultants were heat-treated at 150° C. for 5 hours to prepare a cathode 10 and an anode 15.

The cathode 10 and anode 15 were each cut into 3×3 cm pieces, a cellulose film was used as a separator 20 between the cathode 10 and the anode 15, and 500 ppm of NaCl solution was used as an electrolyte 25 to prepare a cell.

Performance of the cell was evaluated, and the results are shown in FIG. 1. The cell was charged with a constant current of 20 mA until the cell reached 1.2 V, and then, the cell was charged with a constant voltage of 1.2 V to a cut-off current of 2 mA. The cell was discharged with a constant current of 20 mA to a cut-off voltage of 0 V.

Since side reactions occur in the cell according to Comparative Example 1 at a voltage higher than 1.2V, the cut-off was set to 1.2 V.

According to the present invention, capacity can be largely increased by applying catalytic reactions using a material having characteristics of a pseudo capacitor to the cathode 10 in comparison to using a conventional EDLC material in the cathode 10. Capacity can further be increased by raising operating voltage of the system by raising potential in the catalytic reaction performed in the cathode 10. In addition, capacity of a cathode 10 using a supported catalyst is further increased as power output increases because of reduction in resistance of the entire system due to low resistance of the electrode 50. Further, manufacturing costs can be reduced since the volume of the entire system can be reduced to less than ½ the volume of a conventional system, and the amount of materials forming the current collector, the separator, and the like can be decreased to less than half.

Various supercapacitors 100 or electrochemical apparatuses 200 for water purification can be prepared by persons of ordinary skill in the art according to Examples of the present invention.

While the present invention has been shown and described with reference to some exemplary embodiments thereof, it should be understood by those of ordinary skill in the art that various changes in form and details may be made therein without departing from the spirit and scope of the present invention as defined by the appended claims.

What is claimed is:

1. A supercapacitor comprising:
    a cathode;
    an anode;
    a separator interposed between the cathode and the anode; and
    an electrolyte interposed between the cathode and the anode,
    wherein the cathode comprises a catalyst having characteristics of a pseudo capacitor and a binder,
    the catalyst comprises a material which reversibly oxidizes and reduces at least one of a hydroxy group and oxygen of the electrolyte, and
    the anode comprises a carbonaceous material and a binder.

2. The supercapacitor of claim 1, wherein the catalyst comprises at least one selected from the group consisting of a nano metal and a metal oxide.

3. The supercapacitor of claim 2; wherein the nano metal is at least one selected from the group consisting of Pt, Rh, Au, Ag, Ir, Pd, Co, V, and Fe.

4. The supercapacitor of claim 2, wherein a mean particle diameter of the nano metal is in the range of approximately 2 to 20 nm.

5. The supercapacitor of claim 2, wherein the metal oxide comprises at least one selected from the group consisting of $CaTiO_3$, $NaWO_3$, $MnO_2$, $PbO_2$, $RuO_2$, and $TiO_2$.

6. The supercapacitor of claim 1, wherein the catalyst comprises a supported catalyst in which a nano metal or a metal oxide is on a conductive support.

7. The supercapacitor of claim 6, wherein the conductive support comprises a specific surface area of at least 10 square meters per gram, and is carbon black, titanium carbide, or a conductive powder.

8. The supercapacitor of claim 6, wherein the nano metal is at least one selected from the group consisting of Pt, Rh, Au, Ag, Ir, Pd, Co, V, and Fe.

9. The supercapacitor of claim 6, wherein a mean particle diameter of the nano metal is in the range of approximately 2 to 20 nm.

10. The supercapacitor of claim 1, wherein the carbonaceous material comprises at least one selected from the group consisting of activated carbon, carbon nanotubes (CNT), and mesoporous carbon.

11. The supercapacitor of claim 1, wherein the electrolyte comprises an aqueous solution in which a salt is dissolved.

12. An electrochemical apparatus for water purification comprising a supercapacitor comprising:
    a cathode;
    an anode;
    a separator interposed between the cathode and the anode; and
    an electrolyte interposed between the cathode and the anode,
    wherein the cathode comprises a catalyst having characteristics of a pseudo capacitor and a binder,
    the catalyst comprises a material which reversibly oxidizes and reduces at least one of a hydroxy group and oxygen of the electrolyte, and
    the anode comprises a carbonaceous material and a binder.

13. The electrochemical apparatus of claim 12, wherein the catalyst comprises at least one selected from the group consisting of a nano metal and a metal oxide.

14. The electrochemical apparatus of claim 13, wherein the nano metal is at least one selected from the group consisting of Pt, Rh, Au, Ag, Ir, Pd, Co, V, and Fe.

15. The electrochemical apparatus of claim 14, wherein a mean particle diameter of the nano metal is in the range of approximately 2 to 20 nm.

16. The electrochemical apparatus of claim 12, wherein the catalyst comprises a supported catalyst in which a nano metal or a metal oxide is on a conductive support.

17. The electrochemical apparatus of claim 16, wherein the conductive support comprises a specific surface area of at least 10 square meters per gram, and is carbon black, titanium carbide, or a conductive powder.

* * * * *